July 3, 1928.

E. F. KINZLER 1,676,033

APPARATUS FOR MAKING PHOTOGRAPHIC REPRODUCTIONS

Filed June 6, 1925     2 Sheets-Sheet 1

INVENTOR
Edward F. Kinzler
By Kay, Totten & Martin,
Attorneys.

July 3, 1928.  1,676,033
E. F. KINZLER
APPARATUS FOR MAKING PHOTOGRAPHIC REPRODUCTIONS
Filed June 6, 1925   2 Sheets-Sheet 2
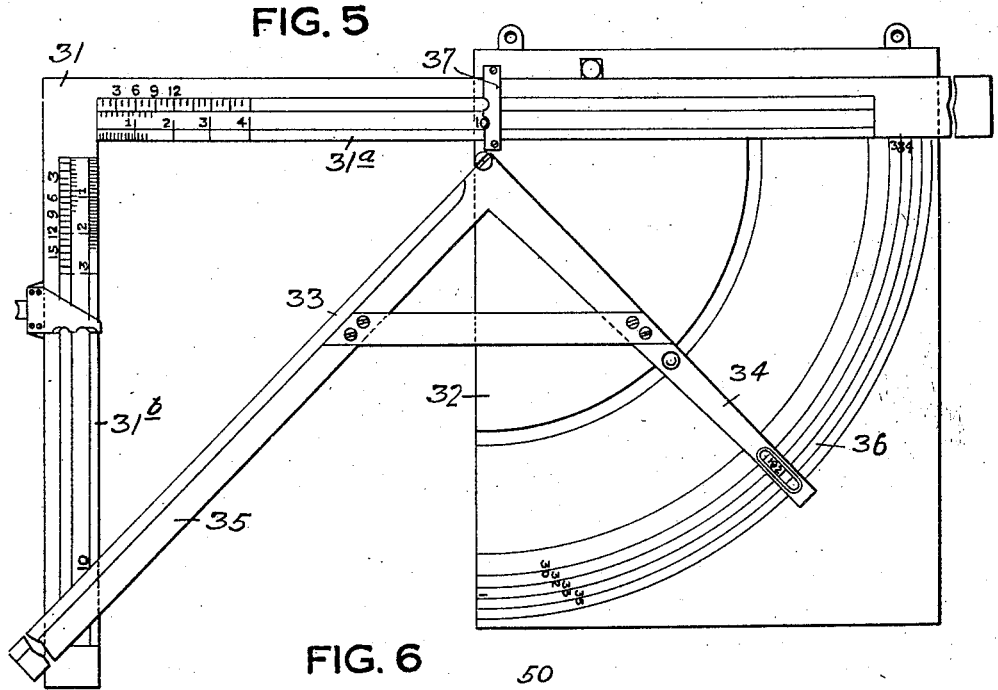
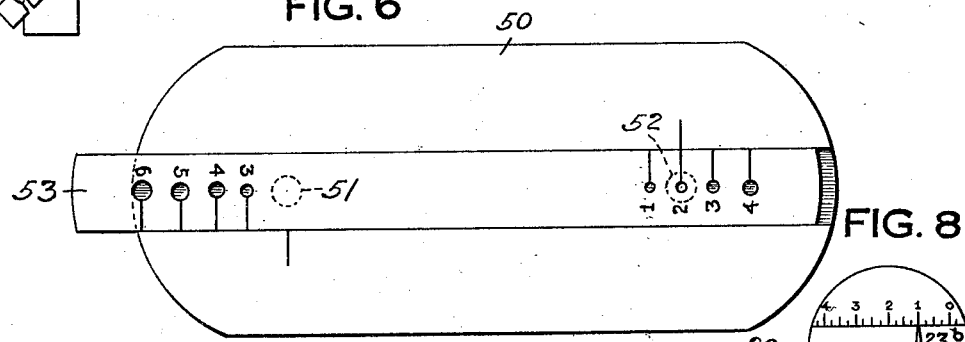
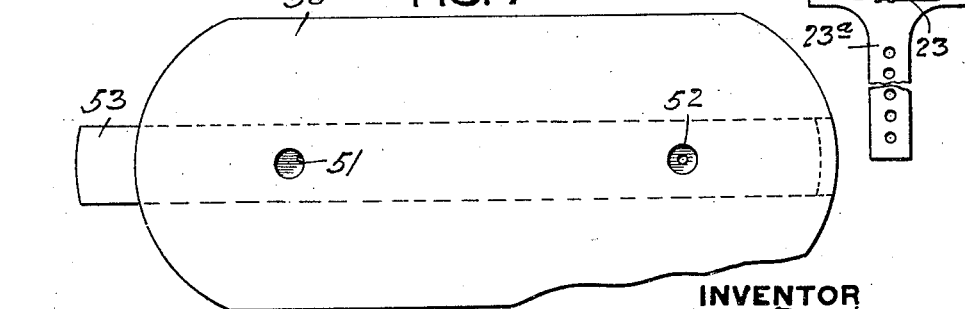
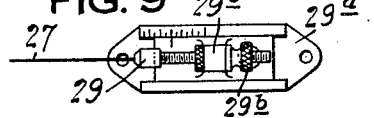
INVENTOR
Edward F. Kinzler,
By Kay, Totten & Martin
Attorneys.

Patented July 3, 1928.

1,676,033

UNITED STATES PATENT OFFICE.

EDWARD F. KINZLER, OF PITTSBURGH, PENNSYLVANIA, ASSIGNOR OF ONE-HALF TO ROBERT RAWSTHORNE, JR., OF PITTSBURGH, PENNSYLVANIA.

APPARATUS FOR MAKING PHOTOGRAPHIC REPRODUCTIONS.

Application filed June 6, 1925. Serial No. 35,321.

My invention relates to apparatus employed in connection with the making of photographic reproductions such as half tones and the like.

One object of my invention is to provide a means whereby exposures may all be for a uniform period of time, irrespective of the size of reproduction desired, thus avoiding the necessity of calculating periods of time required for exposure in reproducing to one scale as compared to the time of exposure required for reproducing to another scale.

Another object of my invention is to provide apparatus whereby more accurate and uniform results may be secured.

Still another object of my invention is to simplify and improve generally apparatus for making photographic reproductions.

Figure 1:
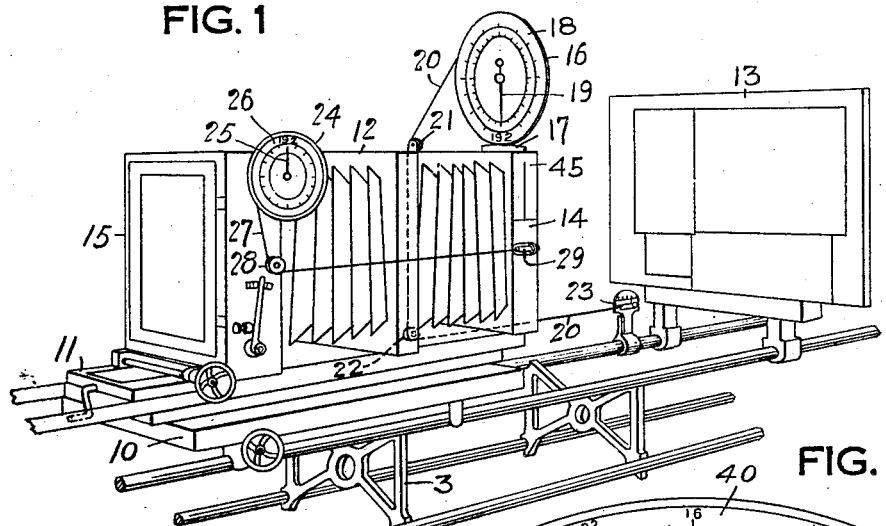
Figure 3:
Figure 2:
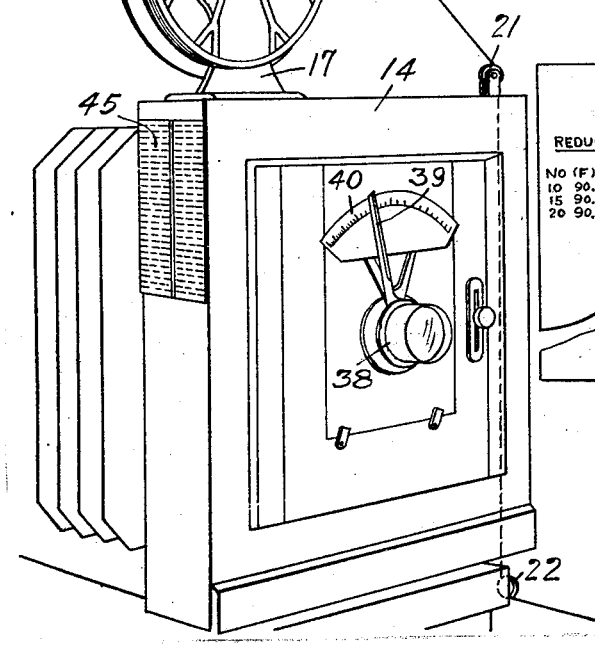
Figure 4:
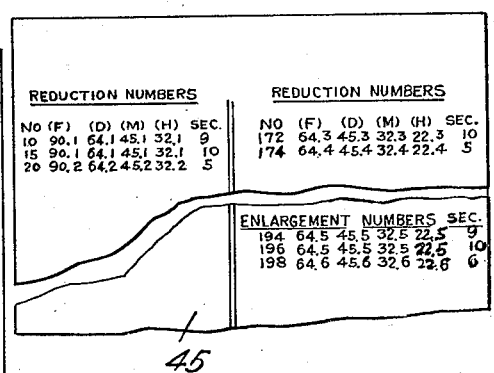

One arrangement by means of which my invention may be practiced is shown in the accompanying drawing, wherein Fig. 1 is a perspective view of a camera embodying a portion of my system; Fig. 2 is a front perspective view, on an enlarged scale, of the camera of Fig. 1; Fig. 3 is a view, on a still further enlarged scale, of the dial of Fig. 2; Fig. 4 is a fragmentary view of a chart which may be employed with my system; Fig. 5 is a view showing the scaling device which I employ; Figs. 6 and 7 are front and rear views, respectively, of the flash stop which I employ, and Figs. 8 and 9 are detail views of the copy thickness and screen allowance devices, respectively, shown in Fig. 1.

A major portion of the apparatus shown in Fig. 1 need not be described in detail since the principle of operation is substantially the same as shown in my Patent No. 1,510,942 issued October 7, 1924.

The apparatus comprises a main slide 10, upon which is mounted a second slide 11, these slides being movable relative to one another in a longitudinal direction, and also movable relative to the supporting frame 3, in the manner described in my patent above referred to, or in any other well known manner. The positions of the slides are varied to change the location of the camera 12 with respect to the copy board 13, in order to secure the desired size and focus.

The camera is provided with a lens frame 14 and a rear frame 15 connected to a bellows in the usual manner. A rotatable drum 16 is mounted upon the lens frame 14 and is provided with a spring (not shown) which tends to rotate the drum in a counter clockwise direction, as viewed in Fig. 2. The drum is rotatably supported by a bracket 17. A dial 18 is fixedly mounted on the bracket 17 and contains graduations or scale marks as will be hereinafter explained. A pointer 19 is connected to the drum 16 so as to rotate therewith. A control wire or cord 20 has one end connected to the periphery of the drum 16 and its other end passed around sheaves 21 and 22 and secured to a fixed member 23. The wire 20 is maintained under tension by the spring-tensioned drum 16. As the lens frame 14 is moved toward and from the copy board 13 the drum will be rotated by reason of its connection through the wire 20 to an adjustable slide 23. The indicator hand 19 will therefore be moved along the face of the dial 18 a distance corresponding to the position occupied by the lens frame 14 with respect to the copy board 13.

The slide 23, to which one end of the wire 20 is anchored (Figs. 1 and 8), is slidably supported by a bracket 23ª that is fixedly mounted relatively to the copy board 13. The bracket 23ª is scaled to correspond to various thicknesses of copy or in relation to the thickness of a copy frame which may sometimes be mounted on the board 13. The slide 23 has dove-tailed connection with the bracket along the scale thereof, in accordance with the thickness of copy, and may be fixed at any desired position, by a set screw 23ᵇ. Thus any change in the normal distance between the subject on the copy board and the camera lens may be compensated for, thus permitting various thicknesses of copy to be used with the same set of scale or key numbers and avoiding the necessity of shifting the copy board.

In order to secure an indication or reading of the bellows extension, which is the position of the frame 15 relative to the frame 14, I mount a revolvable drum 24 on the rear or plate frame 15, such drum being provided with a spring tending to rotate the same in a clockwise direction as viewed in Fig. 1. This drum is provided with a pointer 25 which moves across the face of a dial 26 that is fixedly mounted on the frame 15. A wire 27 is connected at one end to the drum 24, passes through a sheave 28 and is secured at 29 to the lens frame 14. The numbers on the dials 18 and 26 are so arranged that when the lens frame 14 occupies such relation to the copy board 13 that the pointer 19 is opposite a given number on the dial 18, proper focusing will be effected upon the plate by moving the frame 15 to such point relative to the frame 14 that the pointer 25 will point to a corresponding number on the dial 26.

As shown more clearly in Fig. 9, the member 29, to which the wire 27 is secured, has a threaded shank which extends through an opening in the bracket 29<sup>a</sup> that is secured to the lens frame. A nut 29<sup>b</sup> engages the threaded extension and seats against the perforated lug 29<sup>c</sup> on the bracket. The member 29 may thus be adjusted along the scale of the bracket 29<sup>a</sup>. This arrangement is for the purpose of compensating for the change of focus as between the plate and the lens, which is brought about by interposing a glass screen therebetween. If this compensating adjustment were not provided, the numbers on the dial 26 could not accurately indicate the proper focusing distance between the plate and lens frames, when the camera is used both with and without screens.

In order to determine at which number on the dials the pointers 19 and 25 must be brought in order to secure the desired reduction or enlargement on the photographic plate of the subject carried by the copy board 13, I have devised a scaling device which is shown in Fig. 5. Only a brief description of the scaling device will be made in this application, since the structure and mode of use are explained in detail in my Patent No. 1,438,498, issued December 12, 1922. This scaling device comprises a square 31 and a slide or scale board 32 to which an indicator 33 is pivotally connected, such indicator being provided with arms 34 and 35. As the indicator 33 is moved about its pivot the arm 34 will move past numbers on the scale 36, such numbers being indicated as running from 1 to 384. The number 192 is at midpoint on the scale 36 so that when the slide 32 is so moved as to bring the pointer 37 opposite the ten inch mark on the leg 31<sup>a</sup> of the square, for instance, which may correspond to either the width or the length of the subject being photographed, and the indicator 33 is rocked so that its arm 35 will be at the ten inch mark on the leg 31<sup>b</sup> of the square, the arm 34 will be in registry with number 192.

The legs 31<sup>a</sup> and 31<sup>b</sup> are scaled in inch, agate and pica measurements as a matter of convenience, so that in preparing material for reproduction use with printed matter the sizes of the proposed reproductions with relation to the usual printer measurements can be more readily determined. The number 192 on the scale 36 is at the midpoint thereon as above explained and therefore indicates that a reproduction is to be made exactly to scale. If the scale device 32 were moved to bring the pointer 37 to the four inch mark, for instance, and the arm 35 moved up to the four inch mark on the leg 31<sup>a</sup> of the square, the arm 34 would be in register with the key number 192.

In scaling for enlargements, the arm 35 would be at a greater distance from the apex of the square than the indicator 37 and the arm 34 would therefore occupy a position higher along the scale 36 than that shown in the drawing, while for smaller reproductions such arm would register with some number below 192.

The member 33 may be locked at such position that its arm 34 registers with the desired reduction or enlargement number. Thereafter it will be necessary only to slide the member 32 along the scale 31<sup>a</sup> to the mark which indicates the size of the copy being reproduced. The arm 35 will then indicate in inches, picas or agates, the exact size of the reproduction which will be made from that particular copy.

The dials 18 and 26 are so pointed off and numbered that when a key number is ascertained by means of the scaling device 32, upon movement of the camera frames 14 and 15, respectively, to such points that their indicators will each register with a number corresponding to the key number, the camera will be in proper exposure position with respect to the copy board.

The camera is provided with a diaphragm barrel 38 which is rotatable in order to effect the desired amount of diaphragm opening, in a manner well known in this art. To this diaphragm barrel I have connected a pointer 39 which is movable across a scale plate 40 that is secured to the lens frame 14. This scale plate 40 is provided with graduations which are known in the art as "F readings" so that as the pointer 39 is moved to vary the diaphragm opening, such opening may be clearly indicated by such graduations.

In order to accurately determine the width of diaphragm opening needed for each of the various exposures which are usually required in making half tones, for example, and with respect to various degrees of enlargement or reduction, I provide a chart 45 which, in the column marked "No." contains, in sequence, numbers from 1 to 384, corresponding to the numbers on the scale 36 of Fig. 5. In the columns marked "F", the numbers 90.1, 64.3 etc. indicate the degree of diaphragm opening required in making a flash exposure. The pointer 39 would therefore be turned on the scale 40 to 90.1 or to 64.3 as the case may be, depending upon whether the scale arm 34 registered with 15, for instance, or with 172 on the scale 36.

Following the flash exposure, if it is desired to make an exposure to secure details of the subject on the copy board, reference is had to the "D" column of the chart 45, and is moved on the scale plate 40 to 64.1 or 45.4, depending upon whether the number 15 or 174 is indicated by the scale arm 34 as being the key number. The "M" column refers to middle tones. In making middle tone exposures the diaphragm controlling arm 39 would be moved to points 45.1 or 32.4 on the scale plate 40. For high light exposures the "H" column is consulted and the pointer 39 moved to 32.1 or 22.4.

This arrangement of co-operative relation as between the scaling device 32, the camera extension indicator 19, the bellows extension indicator 25, the diaphragm indicator 39 and the chart 45, eliminates the necessity of making calculations to determine the amount of exposure a plate should have when making reproductions of a given size as compared to the length of exposure required in making reproductions of other sizes. By varying the diaphragm openings in making the various exposures of the subject, in accordance with the key number, the period of exposure determined upon as suitable for reproduction to a given scale will be a true measure of the period of time required for exposure in making a reproduction of any other size relative to the original.

The various diameters of diaphragm openings which are listed on the chart 45, for flash exposures (F); detail exposures (D); middle tone exposures (M), and high light exposure (H), opposite the various reduction and enlargement numbers (No. column) have been so calculated as to be suitable for various well known time exposure combinations, as will hereinafter appear.

In making half tone negatives it is customary to place a plain white sheet upon the copy board and make a flash exposure thereof on the plate. If a fine screen is interposed between the plate and the lens, it is desirable to provide a smaller opening than is possible by the use of the diaphragm. It is for this purpose that I provide a flash stop 50, as shown in Figs. 6 and 7. This flash stop consists of the plate 50 which has openings 51 and 52 behind which a slide 53 is mounted. The slide 53 may have dove-tail connection with the plate 50 and is provided with openings as indicated by the numbers 1 to 6. The numbers 3 and 4 are duplicated at the ends of the slide 53 as a matter of convenience because they are the openings most often used. The openings 1 to 6 are of graduated size and may be brought opposite to the openings 51 or 52, by movement of the slide 53.

The openings 1 to 6 of the flash stop 50 bear a definite relation to the control or key numbers above referred to. If the key number is indicated by the scale 36 as being not higher than 50, flash stop No. 1 of the slide 53 is brought opposite to the opening 51 of the flash stop 50 and such flash stop placed over the lens during the preliminary flash exposure referred to. For control numbers 51 to 100, flash stop No. 2 is employed; for control numbers 101 to 200, flash stop No. 3 is employed, while for control numbers 201 to 312, flash stop No. 4 is employed, and so on.

For coarse screen work, the flash stop may be dispensed with and the diaphragm openings made in diameters as indicated in the "F" column of chart 45, according to the key number of the reproduction. Below are given some combinations of exposure times, in seconds, which may be employed in making the flash exposure, detail exposure of the subject, middle tone exposure thereof, and high light exposure, being indicated in the columns "Flash" or "F", "D", "M", and "H", respectively.

| Combination | Flash | (F) | (D) | (M) | (H) |
|---|---|---|---|---|---|
| A | 75 | 0 | 120 | 30 | As indicated on chart. |
| B | 75 | 0 | 0 | 120 | 0 |
| C | 60 | 240 | 0 | 60 | 0 |

The "flash" column above is employed only in connection with the flash stop in Figs. 6 and 7, for fine screen work, as when the screen is finer than 100 lines per inch. The "F" column refers to the flash exposures made without the use of the flash stop 50, but instead thereof diaphragm openings as indicated in column "F" of chart 45 are employed. No. 90 on the diaphragm scale is the smallest opening and as the pointer 39 is moved to the right the diaphragm opening increases.

Either of the combinations A, B or C may be employed, depending upon conditions or the personal preference of the operator. Thus for all reduction and enlargement numbers, the "A" combination may be employed, or the B and C combinations may be utilized, if desired, as well as various other combinations.

In fine screen work, assuming that the reduction number 172 is indicated by the arm 34 of the scale, and combination "A" is to be employed: the opening No. 3 of the flash stop would be placed over the lens and the exposure continued for seventy-five seconds; the flash stop would then be removed and the white paper removed from in front of the copy. The pointer on the lens scale would then be moved to 45.3 and the exposure continued for 120 seconds. The lens is capped after each exposure. The pointer would then be moved to 32.3 and exposure made for 30 seconds. The pointer would be moved to 22.3 and exposure made for ten seconds—as indicated on the last column of the chart.

For coarse screen work, the proper diameter of flash opening is as shown in column F on the chart 45, and is made in the diaphragm. Exposure may be made by either of the combinations D and E given below, or other combinations employed.

| Combination | F | D | M | H |
|---|---|---|---|---|
| D | Seconds—20 or | 10 | 120 | 0 |
| E | Seconds—20 or | 10 | 75 | As indicated on chart. |

In exposing coarse screen negatives the first F column on the chart is employed instead of the flash stop 50 which is used for fine screen work. The stop is employed on fine screen negatives because in many cases the diaphragm opening cannot be made small enough.

The foregoing examples are based on the use of two 25 amp. lights placed about 36″ from the copy on a 45° angle. Other lighting effects require different exposure periods.

In practicing my invention I first scale the picture to secure the required reduction or enlargement key number, move the camera and bellows extensions such distance that the pointers thereon will indicate the key number, and find the key number on the chart, which will show the lens openings to use. If for coarse screen work, the F column on the chart is used for the flash opening; for fine screen work the flash stop is employed. The flash exposure is made for the time indicated in the "Flash" or "F" columns, or both. The flash stop, if one is used, is then removed. Thereafter exposures are made under D, M or H as indicated by one of the combinations given above, or any other suitable combination, with the diaphragm openings as indicated in the columns on the chart. The H exposures are made for the time indicated in the "Sec." columns on the chart 45.

I claim as my invention:

1. Photographic apparatus comprising a copy board, a camera having a lens frame movable relative to said copy board, a spring-tensioned drum on said camera frame, for indicating the relative positions of said frame and board, a wire having one end connected to said drum and partially wound thereon, and having its other end secured to an adjustable stop whose position may be varied with respect to the thickness of copy carried by said board.

2. Photographic apparatus comprising a camera having a lens frame and a plate frame that have relative movement, a spring-tensioned drum carried by the plate frame, for indicating the relative positions of the frames, a wire having one end secured to said drum and wound thereon, and its other end secured to a stop mounted on said lens frame, the said stop being adjustable to compensate for change in focusing conditions as between the lens frame and the plate frame, as when a screen is employed.

3. Photographic reproduction apparatus comprising a copy holder, a camera extension member mounted for adjustment relative to said holder, a distance scale for indicating such adjustment, and means for modifying the scale indication to compensate for copy of different thicknesses.

4. Photographic reproduction apparatus comprising a copy holder, a camera extension member mounted for adjustment relative to said holder, a scale for indicating the nature or amount of such adjustment, and means for compensating such scale to provide a true indication of the adjustment irrespective of the thickness of the copy.

In testimony whereof I, the said EDWARD F. KINZLER have hereunto set my hand.

EDWARD F. KINZLER.